United States Patent
Smith et al.

(10) Patent No.: US 7,754,661 B2
(45) Date of Patent: Jul. 13, 2010

(54) RECYCLING OF OIL-BASED DRILLING MUDS

(75) Inventors: Clayton Smith, Edmonton (CA); Simon John Michael Levey, Edmonton (CA)

(73) Assignee: Innovative Chemical Technologies Canada Ltd

( * ) Notice: Subject to any disclaimer, the term of this patent is extended or adjusted under 35 U.S.C. 154(b) by 128 days.

(21) Appl. No.: 11/945,980

(22) Filed: Nov. 27, 2007

(65) Prior Publication Data
US 2008/0121564 A1    May 29, 2008

Related U.S. Application Data

(60) Provisional application No. 60/867,420, filed on Nov. 28, 2006.

(51) Int. Cl.
*C10G 17/02* (2006.01)
*C09K 8/36* (2006.01)
*C10M 175/04* (2006.01)
*C10G 19/073* (2006.01)

(52) U.S. Cl. .......................... 508/111; 208/13; 175/65; 175/66

(58) Field of Classification Search .................. 208/13; 508/111; 175/65, 66; 166/270.1, 270.2, 166/305.1, 308.1, 308.2, 308.3, 308.4, 308.5, 166/308.6
See application file for complete search history.

(56) References Cited

U.S. PATENT DOCUMENTS

| | | | | |
|---|---|---|---|---|
| 5,154,831 A * | 10/1992 | Darian et al. | ............... | 210/639 |
| 5,286,386 A * | 2/1994 | Darian et al. | ............... | 210/639 |
| 6,218,342 B1 | 4/2001 | Patel | | |
| 6,689,925 B2 * | 2/2004 | Malhis | ....................... | 585/240 |
| 6,793,025 B2 | 9/2004 | Patel et al. | | |
| 6,989,354 B2 | 1/2006 | Thaemlitz et al. | | |
| 2001/0051593 A1 * | 12/2001 | Patel | ........................ | 507/129 |
| 2002/0055438 A1 * | 5/2002 | Giard-Blanchard et al. | . | 507/100 |
| 2006/0042796 A1 * | 3/2006 | Qu et al. | ..................... | 166/279 |

FOREIGN PATENT DOCUMENTS

| | | |
|---|---|---|
| EP | 1293550 | 3/2003 |
| EP | 1293550 A2 * | 3/2003 |

* cited by examiner

*Primary Examiner*—Glenn A Caldarola
*Assistant Examiner*—Pamela Weiss
(74) *Attorney, Agent, or Firm*—Sean W. Goodwin; Linda M. Thompson

(57) ABSTRACT

A method of recovering hydrocarbon or synthetic base oils from used oil-based drilling mud utilizes acid to deactivate emulsifiers in the drilling mud for altering the emulsion stability and permitting removal of the solids contained in the drilling mud using conventional separation such as centrifugation. A surfactant is typically added to prevent water-wetting as a result of the addition of the acid. The recovered base oil contains substantially all of the deactivated emulsifiers, which can be reactivated through the addition of lime, allowing new drilling fluids to be prepared without the need to add significant amounts of emulsifier to the recycled base oil.

18 Claims, 2 Drawing Sheets

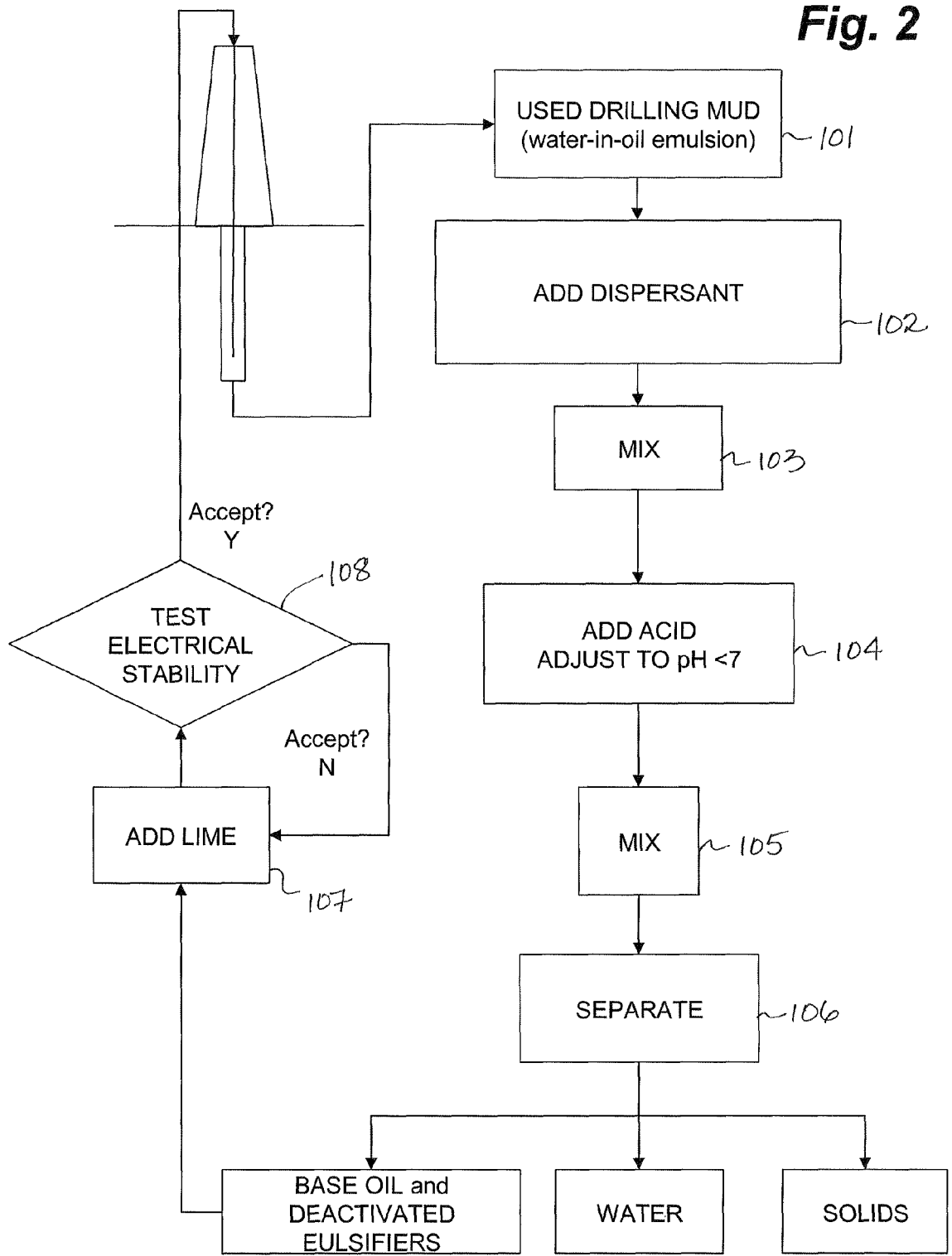

RECYCLING OF OIL-BASED DRILLING MUDS

CROSS REFERENCE TO RELATED APPLICATION

This application is a regular application claiming priority of U.S. Provisional Patent application Ser. No. 60/867,420, filed on Nov. 28, 2006, the entirety of which is incorporated herein by reference.

FIELD OF THE INVENTION

Embodiments of the invention relate to processes for recycling hydrocarbon and synthetic base oils from drilling fluids and more particularly to processes of removing ultra-fine particulate materials for recycling the base oil for use in preparing drilling fluids without the need to add additional emulsifiers.

BACKGROUND OF THE INVENTION

Water-in-oil emulsions (oil-mud) are often used in circulating fluids required in the rotary drilling of formations containing hydrocarbons. The circulating fluids are referred to as drilling muds. The common specification of the term "mud" is defined according to its usual meaning in the oil and gas drilling industries, namely to describe a drilling fluid used to transport rock cuttings from a wellbore.

Such fluids or mud formulations are typically tailored to specific well bore conditions and are costly to formulate. The most expensive component of oil-mud systems is the hydrocarbon or synthetic base oil used as the fluid matrix for such systems. One objective in the process of drilling is, therefore, to conserve drilling muds, and where possible recycle and reuse the base oil.

Oil-mud circulating fluids are pumped down the drill pipe and out into the wellbore through holes in the drill bit and are recirculated back up the well in the annular space between the drill pipe and walls of the well bore, carrying with it drill cuttings and the like that are then removed before recirculation. The mud performs a number of functions, including removing drill cuttings, lubricating and keeping the bit cool, providing flotation to help support the weight of the drill pipe and casing, providing hydrostatic pressure to prevent caving in and undesirable flow of fluids and/or gases in or out of the well bore, including drilling fluids, brine, and the like.

The properties and composition of the drilling mud formulations are complex and variable, depending on the conditions involved and the results desired or required including the ability to reuse and recycle the mud formulations. In oil mud-drilling fluids, the oil, hydrocarbon or synthetic, is the continuous phase and the water is present in a dispersed phase. This is necessary to maintain the required rheology of the mud for drilling and completion, including a balance between gel strength and viscosity, i.e., the balance for example between pumpability of the mud and its hole cleaning capability. Further, it is necessary to maintain the oil phase as the external phase in order to keep the drilled solids oil-wet to prevent the solids from coming in contact with water and easily dispersing in the mud.

Mud solids include particles that are drilled from the formation, material from the inside surface of the hole and materials that are added to control the chemical and physical properties of the mud, such as weight material, including but not limited to barite and calcium carbonate and the like. Drilled solids' particles are created by the crushing and chipping action of rotary drill bits. Additional solids enter the well bore by sloughing from the sides of the open hole. From the time they enter the well until they reach the surface, drilled solids particles are continuously reduced in size by abrasion with other particles and by the grinding action of the drill pipe.

If mud solids are not properly controlled, the mud's density can increase above its desired weight and the mud can get so viscous that it creates difficulties in pumping the fluid. The increase in density can become critical if the density exceeds the pore pressure of the formation which can lead to loss of the fluid and increased costs related thereto. Since the earliest days in the oil industry, drillers have been trying to combat high solids content through the use of settling pits. However, some drilled solids are so finely ground that they tend to remain in suspension regardless how long they are allowed to settle. The fine solids in suspension result in increased mud viscosity and gel strength, which in turn results in larger particles also remaining in suspension. Thus, the approach of removing cuttings through settling alone is of limited practical value.

Of primary detriment to drilling fluids are ultra fine (5 μm to 30 μm) and colloidal (0.1 μm to 5 μm) size drill cutting particles. These small particles, if not removed, create havoc in a variety of ways. They slow the rate of penetration (ROP) compounding the number of rig days required and the cost. They disrupt the drilling fluid rheology, especially gel strengths, thereby upsetting the Equivalent Circulating Density (ECD), risking mud losses and worse, creating potential blow out situations. Ultra fine particles and colloidal particles cannot typically be removed by shale shakers, de-sanders, de-silters, or mud cleaners. Conventional centrifuges can typically only remove solids down to about 10-20 μm. Under conventional methodologies, ultra fine particles and colloidal particles create the need for excessive dilution to control the fluid density thus escalating mud cost and worse, contributing to environmental disposal problems by excessive mud build-up.

Based on studies done in the early 1970's, ultra-fine colloidal solids have the most detrimental reduction effect on ROP. Research has demonstrated that doubling colloidal content, though it may be only a relatively small part of overall solids volume, can reduce ROP by as much as 70-80%. As the solids surface area grows, water demand and chemical demand of the fluid grows, exponentially increasing demand for hydraulic horsepower, driving up plastic viscosity and creating sticky, spongy cakes on the wellbore walls.

Further, ultra-fine solids are not the only contaminants of invert-emulsion drilling muds. Additional aqueous fluids that can be introduced into these systems can lead to significant difficulty in the recovery of the base oil fluid. During the drilling process, it is also not uncommon for the drilling fluid to encounter a water bearing formation and thus, the ratio of aqueous fluid to non-aqueous fluid is less than optimal. In some cases, the formation of a difficult-to-break emulsion occurs and this is often referred to as the "slop". The oil to water ratio in the slop may be 25/75 or 30/70 or similar such numbers. Using conventional methods of emulsion breaking it is possible to recover, for example, a 60/40 ratio of oil to water fluid. The recovered oil is then diluted with additional make up oil to achieve the desired ratio, being typically 80/20. One of the primary difficulties associated with this system is the use of emulsion breakers and surface tension breakers that are not environmentally friendly. There are many citations in the literature that deal with the separation of the excess aqueous fluids from invert-emulsion drilling fluids, such as U.S. Pat. No. 6,881,349 to Mueller and U.S. Pat. No. 6,977,048 to Mueller.

Drilling fluids made up of expensive polymers and oil base synthetics demand high performance decanters to control excessive mud cost. As the drilling parameters become more and more complex, involving high temperature additives, etc., the need to remove ultra fine and colloidal particles from the mud becomes paramount.

Drilling performance is typically optimized by the use of oil based or synthetic based mud. However, in an attempt to make these technologies more commonplace and acceptable from an economic standpoint, there is a definite need to be able to use the fluid systems as many times as possible. Further, there is a need to avoid major environmental issues created by the disposal of waste material generated from the use of these systems.

There are a number of different methodologies noted in the literature for cleaning of drill solids, but very little has been done to address the recovery and reuse of the hydrocarbon base oil from an economic standpoint, which may lead to reduced oil and gas exploration costs.

SUMMARY OF THE INVENTION

Embodiments of the invention provide a substantially universal drilling mud recycling method for oil-based drilling muds which utilize surfactants or emulsifiers which are lime/fatty acid based. Hydrocarbon and synthetic base oils are recovered according to embodiments of the method of the invention, the recovered base oils comprising substantially all of the emulsifiers from the drilling mud and at least a portion of the organoclays. Later, addition of lime to the recovered hydrocarbon base oil is sufficient to reactivate the recovered emulsifiers for preparation of a new drilling mud.

In a broad aspect a method for recovering a hydrocarbon base oil from used water-in-oil emulsion drilling muds containing drilled solids comprises: adding a surfactant, the amount of the surfactant being sufficient only to prevent viscosity increases in the drilling mud as a result of at least partial water-wetting of organoclays in the drilling mud; mixing the dispersant with the used drilling mud; adding an acid, the acid selected for having low affinity for the base oil phase of the drilling mud, to the surfactant-treated used drilling mud, sufficient to reduce the pH of a water phase of the drilling mud to a value of less than about 7 for deactivating emulsifiers in the used drilling mud; mixing the surfactant-treated drilling mud with the acid for sufficient time to deactivate the emulsifiers; and separating the base oil phase from the water phase and from at least the drilled solids contained therein, wherein the recovered base oil contains at least substantially all of the deactivated emulsifiers.

In another broad aspect of the invention the method further comprises, after the step of separating the base oil from the water phase and at least the drilled solids: adding lime to the recovered base oil in an amount sufficient to reactivate the emulsifiers contained in the recovered base oil for use in preparing a new drilling mud.

In one embodiment, the acid further comprises a non-emulsifier in an amount sufficient to prevent the acid from forming an oil-in-water or an oil-in-water-in-oil emulsion in the drilling mud.

In one embodiment the acid further comprises a corrosion inhibitor in an effective amount to prevent corrosion of mixing equipment and the like used in a process for recovering the base oil.

BRIEF DESCRIPTION OF THE DRAWINGS

FIG. 2 is a schematic illustrating a recycling process whereby the recovered base oil according to FIG. 1 is treated to reactivate emulsifiers therein for forming a new drilling mud.

DESCRIPTION OF THE PREFERRED EMBODIMENTS OF THE INVENTION

Figure 1:
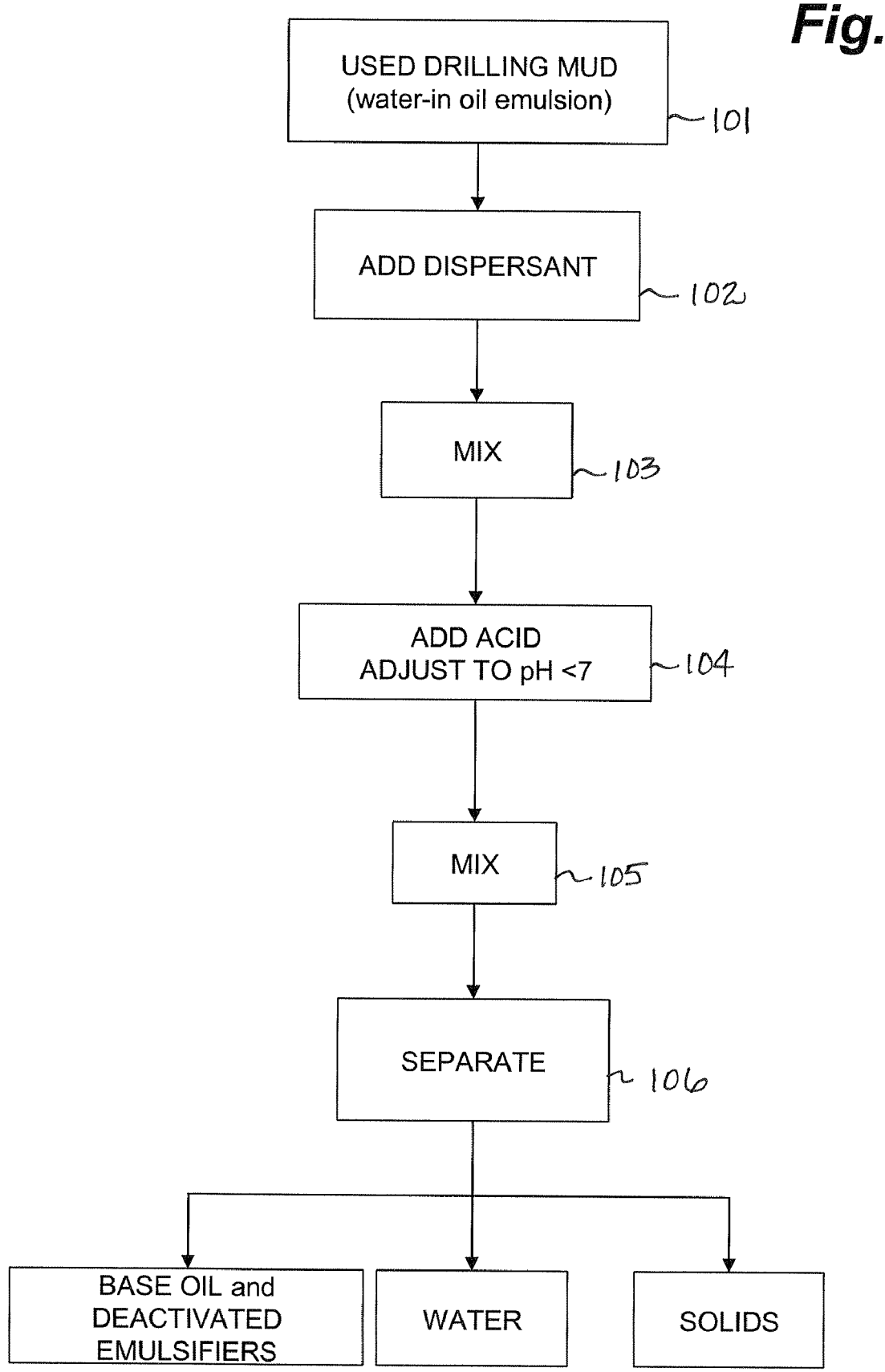
FIG. 1 is a schematic illustrating a recovery process for recovering at least a base oil from used drilling mud.

A hydrocarbon or synthetic oil-based drilling fluid typically comprises a continuous oil phase; a brine phase; emulsifiers and wetting agents; lime; organoclay and at least one weighting agent. The oil based drilling fluid typically exists as a water/brine-in-oil emulsion. The emulsifiers used to create the emulsion are typically fatty acids or derivatives thereof. The emulsion is created by reacting lime (calcium hydroxide) with a fatty acid(s) to create a calcium fatty acid soap. The brine phase is usually calcium chloride, but can consist of other salts and is added to the oil with shear to create the emulsion. In order to stabilize the emulsion and prevent separation an organoclay (viscosifier) is added. Organoclays are swelling clays that have been chemically modified to swell in oil rather than water. Typically, the organoclays have been chemically treated with a quaternary amine. Weighting agents are added to the system to increase the density of the fluid to counteract the formation pressures. Typical weighting agents are barite and calcium carbonate.

Embodiments of the invention comprise overcoming the mechanisms that stabilize the emulsion which includes neutralizing the emulsifiers, typically fatty acid and lime which form soaps, present in solids-contaminated drilling fluid which has been returned from a wellbore. The fatty acid emulsifiers, when neutralized, become inactive in the oil phase of the drilling fluid and no longer support the emulsion stability and, by extension, the stability of the drilling mud. The reduction in viscosity and emulsion stability aids in allowing the solids to be removed using conventional methodologies such as centrifugation.

In embodiments of the invention, neutralizing the fatty acid and lime is achieved by the addition of an acid selected to have little affinity for the oil, typically a mineral acid such as sulphuric acid or more preferably hydrochloric acid. If sulphuric acid is used, the calcium source precipitates and may create some additional viscosity issues however, if hydrochloric acid is used the calcium source is solubilized.

Sufficient acid is added to the solids-containing drilling mud to reduce the pH of the water-phase to a value less than 7 and preferably to a value less than 4. Neutralizing the fatty acid to a pH of approximately pH 4 or less deactivates the emulsifiers, but does not destroy or break down the emulsifiers and therefore the emulsifiers may be reactivated again upon the addition of lime once the solids have been removed, such as by centrifugation.

As the same mechanism that lends stability to the water-in-oil emulsion also aids in the ability of the solids to be oil-wet, use of acids to neutralize the fatty acid and lime results in water wetting of the solids, which enhances the ability to remove the solids using conventional methodologies such as centrifugation. The at least partial water-wetting which occurs upon neutralizing the emulsifiers in the drilling mud using embodiments of the invention however may also create additional problems because the water present in the fluid is able to fully activate the organoclays. While organoclays produce 2-D viscosity networks as a result of the clay platelets being dispersed in the oil phase, a significant increase in viscosity occurs when the clay platelets are allowed to form a 3-D network via hydrogen bonding of the hydroxyl groups on the clay edges with the water droplets emulsified in the oil. The presence of a large amount of free water as a result of neutralizing the emulsifiers causes the organoclay to yield and potentially result in up to a five-fold increase in viscosity which is detrimental to the removal of the solids.

In order to combat the effect of water wetting on the organoclay, a dispersant or surfactant is added. Conventional surfactants which act to reduce viscosity by preventing water-wetting of organoclays in the muds are acceptable. Anionic surfactants have been found to be of particular use. It is commonly known to those skilled in the art that dodecylbenzene sulphonic acid (DDBSA) acts as a dispersant to decrease the viscosity of greases when organoclays have been used as gellants. Applicant has found however that surprisingly, DDBSA can also be used to overcome 3-D viscosity build-up, a phenomenon not previously noted in the literature. Applicant believes it is likely that the DDBSA sterically hinders the organoclay from forming any hydrogen bonding with the water droplets and hence prevents the 3-D network from forming.

Sufficient surfactant, such as DDBSA, is added to prevent unacceptable increases in viscosity due to the water wetting which occurs as a result of the neutralization of the fatty acid and lime.

Drilling fluid emulsions are typically very complex systems that contain a variety of surfactants. The inactivation of drilling mud emulsifiers with respect to the emulsifiers' ability to stabilize water-in-oil emulsions may lead to the conversion of the drilling mud system from an oil-external emulsion to a water-external emulsion or an oil-in-water-in-oil emulsion which is detrimental to the separation of solids therefrom.

Applicant has found that use of a non-emulsifier, when added in amounts sufficient only to prevent the acid forming an oil-in-water and/or an oil-in-water-in-oil emulsion in the solids-containing drilling mud, significantly aids in the efficiency of separation of the ultra-fine solids from the base fluid. The non-emulsifiers do not act to counteract the emulsifiers in the solids-containing drilling mud as the non-emulsifier is selected to substantially partition to the aqueous phase rather than the oil phase. Suitable non-emulsifiers may be, but are not limited to, polyalkylene glycols, resin oxyalkylates, amine oxyalkylates, mixed sulphonates, resin esters and diepoxides. One such suitable non-emulsifier is NE005 available from Innovative Chemical Technologies Canada Ltd. of Calgary, Alberta, Canada.

In embodiments of the invention, a corrosion inhibitor is added in amounts sufficient to prevent the acid, which is added to neutralize or inactivate the emulsifiers, from corroding metal surfaces such as on the rig or in mixing equipment. Typically corrosion inhibitors suitable for use in embodiments of the invention must be soluble and stable in the acid. Such corrosion inhibitors typically contain acetylenic alcohols, quinoline quaternary amines, alkyl benzyl quaternary amines, potassium or copper iodides or mixtures thereof. Applicant has found one such suitable corrosion inhibitor to be CA 5051, available from Innovative Chemical Technologies Canada Ltd. of Calgary, Alberta, Canada, In addition to embodiments of the invention having the ability to efficiently destabilize spent colloidal drilling mud systems to yield low density base-oil that can be reused to make "new" muds, embodiments of the invention also result in water-wetting of the finely dispersed ultra-fine and colloidal solids which allow the finely dispersed ultra-fine and colloidal solids to be separated from the base-oil and water phases. Typically separation is effected through centrifugation and the like.

Embodiments of the invention have been able to yield recycled base-oil with a purity of between about 90% to about 100% and with a total base-oil recovery of between about 50% to about 100%.

Method of Treating a Solids-Containing Drilling Mud

As shown in FIG. 1 and in an embodiment, the invention comprises a method in which the concentration of drilled solids in used drilling muds, which have been returned from the wellbore, can be reduced below that possible using mechanical separation alone.

Used drilling mud at 101 is first pre-treated by mixing with from 0% to about 10% by volume of a suitable surfactant at 102, for example Dodecyl Benzene Sulphonic Acid (DDBSA). More preferably, the used drilling mud is mixed at 103 with from about 0% to about 3% by volume DDBSA to inhibit the development of additional viscosity caused by the addition of aqueous fluid to the emulsified mud system.

The surfactant-treated drilling mud is then treated by the addition of an acid at 104 and mixed at 105 therewith for neutralizing the emulsifiers contained therein. The neutralization of the fatty acid is accomplished through the addition of from about 1% to about 10% by volume of 1% to about 36% by weight hydrochloric acid (HCl) and more preferably through the addition of from about 10% to about 60% of 5% to about 28% by weight HCl containing from about 0% to about 10% by weight of a suitable non-emulsifier. More preferably, the non-emulsifier is added from about 0% to about 3% by weight. Sufficient non-emulsifier is added to prevent the acid from being emulsified in the drilling mud before the acid can fully neutralize the fatty acids and thereby deactivate the emulsifiers present therein. Once the emulsifiers are deactivated, such as evidenced by measurements of fluid rheology including but not limited to electrical stability and yield point, the drilling mud can be separated at 106 to recover the base oil which contains substantially all of the deactivated emulsifiers. Typically the separation is achieved by centrifugation.

In one example representative of embodiments of the invention, a sample of about 250 mL of a solids-contaminated drilling mud was treated with 1% by volume DDBSA (2.5 mL) and was mixed for 15 minutes. Following mixing, 100 mL of an acid formulation (40% by volume) containing 9% by weight HCl, 1% by weight non-emulsifier (NE005) and 0.2% by weight corrosion inhibitor (CA 5051) was added and the resulting fluid mixed for between 2 to 16 hours to achieve neutralization of the emulsifiers contained within the used drilling mud. Following mixing with the acid formulation, the sample was centrifuged to separate the base oil, containing substantially all of the deactivated emulsifiers, from the aqueous phase and the solids.

Should the used drilling mud contain drilled solids in excess of 10% by volume, the additional viscosity makes separation of the solids using embodiments of the invention more difficult, Applicant has found however that these difficulties can be overcome.

One method of overcoming the problems associated with excessive viscosity is to dilute the spent mud with additional virgin base-oil to reduce the solids per volume. The added virgin base-oil is recovered with the recovered base-oil.

Optionally, in the case of highly viscous spent mud, additional surfactant, such as DDBSA, may be added to the spent drilling mud to assist with reducing the initial elevated viscosity.

Alternately, high gravity solids may be removed by known methods, such as centrifugation, prior to treating the spent mud using embodiments of the invention.

Reformulation of a Drilling Mud Using Recovered Base Oil

Applicant has found that because embodiments of the invention neutralize, but do not destroy, the emulsifying properties of the fatty acid surfactants used in the drilling fluid, it is possible to easily and cost-efficiently regenerate a new drilling fluid using the recycled base-oil.

Embodiments of the invention not only neutralize the mechanisms that provide stability to the water-in-oil emulsions system, but also ensure that those components responsible are kept substantially mostly in the oil phase rather than being substantially lost to either the aqueous phase or on the surface of the solids present.

One skilled in the art would understand that should a process utilize complete destruction of the surfactant or emulsifier components to attempt efficient separation of the ultrafine and colloidal solids, such a process would be less economical than embodiments of the invention. Upon recycle of the base-oil, using such a destructive process, there would be a need to add emulsifier and organophilic clay components to replace those which were destroyed before a new drilling mud of similar properties can be made.

Having reference to FIG. 2, and because embodiments of the invention do not destroy the surfactants (emulsifiers) during application of embodiments of the invention at steps 101 to 106, but were instead kept substantially soluble in the oil phase, a "new" drilling fluid can be remade without having to add substantial amounts of either primary and secondary emulsifier components or organophillic clay components.

Lime is added at 107 in amounts sufficient to elevate the pH of the base oil containing the deactivated emulsifiers. The pH is sufficiently elevated to reactivate the emulsifiers such as evidenced by measurements of emulsion stability, such as electrical stability and yield point at 108. Thus a drilling fluid can be recreated from recycled base oil without the addition of significant amounts of at least the emulsifier.

EXAMPLES

Testing was conducted as per the American Petroleum Institute Bulletin RP 13B-2, 1998. The following abbreviations may be useful in interpreting the results described in the following examples:

PV Plastic Viscosity (m.Pa.s)—a parameter of a Theological model used to characterize the viscosity of a drilling fluid.

YP Yield Point (Pa)—a parameter of a Theological model used to characterize the viscosity of a drilling fluid.

ES Electrical Stability—indicates the strength of the emulsion, the higher the value the stronger the emulsion.

$\rho_{oil}$—density of oil recovered after centrifugation as measured by the Mettler Toledo Densitometer 30P.

Example 1

The effectiveness of neutralization of the emulsifiers was tested using an embodiment of the invention to water wet the solids and remove the solids from the oil phase. Following treatment with an embodiment of the invention, a portion of the treated sample was centrifuged to remove the solids and a variety of individual tests were performed. As shown in Table 1, 11 samples are shown. Samples 10 and 11 are included to show that increasing acid volume did not further affect the density of the recovered oil.

Each 250 mL sample of solids-containing drilling fluid was added to a beaker and placed on to a paddle mixer at 200 rpm.

The properties of the drilling fluid samples prior to testing were as follows:
1. Density: 1000 kg/m$^3$
2. Oil/Water Ratio (OWR): 90/10
3. Drilled Solids Concentration: 6% v/v
4. Plastic Viscosity: 18 m.Pa.s
5. Yield Point: 2.5 Pa
6. Electrical Stability: 910

Sample 1 was not subjected to treatment according to embodiments of the invention and was separated by conventional centrifugation alone.

Dodecylbenzene sulphonic acid (DDBSA) 10 l/m$^3$ (50% activity) was added to each of samples 2-11 and mixed for 15 minutes. An acid formulation according to an embodiment of the invention and having an acid (HCl) concentration as identified in Table 1 and containing the non-emulsifier (NE005) was added and the resultant mixture was mixed on the paddle mixer for 16 hours. The % v/v of acid added was varied in samples 2-5, 6-9 and 10-11. The % v/v DDBSA was added at 2% v/v for samples 2-5 and at 1% v/v for samples 6-11.

After mixing, 100 ml of each treated sample was centrifuged at 1200 rpm for 10 minutes on a Damon/IEC HN-S centrifuge, available from ThermoFisher Scientific of Waltham, Mass., USA. The density of the recovered oil was measured. The viscosity of the fluid was measured at room temperature using an OFITE Model 900 viscometer, available from OFI Testing Equipment Inc. of Houston, Tex., USA.

TABLE 1

| # | Mix Time | % v/v HCl | % Conc'n HCl | % v/v NE005 | % v/v DDBSA | PV | YP | ES | pH | $\rho_{oil}$ |
|---|---|---|---|---|---|---|---|---|---|---|
| 1 | 0 | — | — | — | — | 15 | 1.5 | 910 | — | 0.950 |
| 2 | 16 | 30 | 20 | 1 | 2 | 29 | 1.5 | 100 | 7 | 0.895 |
| 3 | 16 | 40 | 20 | 1 | 2 | 30 | 3 | 60 | 5 | 0.878 |
| 4 | 16 | 50 | 20 | 1 | 2 | 22 | 2 | 40 | 4 | 0.870 |
| 5 | 16 | 60 | 20 | 1 | 2 | 21 | 3.5 | 40 | 3 | 0.867 |
| 6 | 16 | 30 | 20 | 1 | 1 | 29 | 0.5 | 105 | 7 | 0.887 |
| 7 | 16 | 40 | 20 | 1 | 1 | 28 | 2.5 | 85 | 5 | 0.871 |
| 8 | 16 | 50 | 20 | 1 | 1 | 28 | 3.5 | 50 | 4 | 0.858 |
| 9 | 16 | 60 | 20 | 1 | 1 | 24 | 3 | 35 | 3 | 0.856 |
| 10 | 16 | 30 | 40 | 1 | 1 | 28 | 3.5 | 75 | 1 | 0.860 |
| 11 | 16 | 40 | 40 | 1 | 1 | 29 | 3 | 60 | 1 | 0.859 |

One skilled in the art can see that embodiments of the invention are capable of reducing the solids load in the drilling fluid as evidenced by the reduced $\rho_{oil}$ over that of conventional centrifugation alone as seen in sample #1.

Ideally the density of the recovered base oil should approach that of the virgin base-oil which was, in this case, about 0.84.

Applicant believes that density values in excess of 0.84 are due to the presence of the inactivated emulsifiers and amounts of organoclays which are retained in the base oil and which are advantageous in use to create new drilling muds.

Example 2

Samples of solids contaminated drilling fluid were treated according to embodiments of the invention using different v/v % DDBSA to illustrate that DDBSA, a known demulsifier and dispersant, acts as an exceptional surfactant to reduce the viscosity, especially the PV, as described herein and which aids in removing the solids. The same treatment method was used as in Example 1 and the results are shown below in Table 2.

TABLE 2

| # | Mix Time | % v/v HCl | % Conc'n HCl | % v/v NE005 | % v/v DDBSA | PV | YP | ES | $\rho_{oil}$ |
|---|---|---|---|---|---|---|---|---|---|
| 1 | 0 | — | — | — | — | 15 | 1.5 | 900 | 0.950 |
| 2 | 16 | 40 | 20 | 0 | 0 | 48 | 5.5 | 170 | 0.925 |
| 3 | 16 | 40 | 20 | 1 | 0 | 47 | 4.5 | 150 | 0.920 |
| 4 | 40 | 20 | 20 | 1 | 1 | 17 | 3 | 40 | 0.855 |
| 5 | 16 | 40 | 20 | 1 | 2 | 19 | 2.5 | 55 | 0.859 |

One skilled in the art can see in samples 4 and 5, that DDBSA aids in dispersing the organoclay and drilled solids as shown by the lower plastic viscosity (PV) and also aids in reducing the emulsion strength as shown by the lower electrical stability (ES).

The resulting recovered base oil has a lower density, approaching an ideal density, being that of the virgin base oil used in a drilling fluid.

Example 3

Testing was conducted to illustrate the effect of different mixing times. The same test procedure was used as in Example 1 however the drilling fluid samples were obtained from a different wellbore. The drilling fluid had the following properties:
1. Density: 1100 kg/m$^3$
2. Oil/Water Ratio (OWR): 91/9
3. Drilled Solids Concentration: 7% v/v
4. Plastic Viscosity: 22 m.Pa.s
5. Yield Point: 4.5 Pa
6. Electrical Stability: 1260

TABLE 3

| # | Mix Time | % v/v HCl | % Conc'n HCl | % v/v NE005 | % v/v DDBSA | PV | YP | ES | $\rho_{oil}$ |
|---|---|---|---|---|---|---|---|---|---|
| 1 | 2 | 40 | 25 | 1 | 1 | 47 | 13 | 105 | 0.865 |
| 2 | 4 | 40 | 20 | 0 | 0 | 42 | 11 | 105 | 0.867 |
| 3 | 6 | 40 | 20 | 1 | 0 | 38 | 9 | 100 | 0.865 |
| 4 | 16 | 20 | 20 | 1 | 1 | 33 | 7 | 100 | 0.865 |
| 5 | — | — | — | — | — | 22 | 4.5 | 1260 | 0.920 |

It was noted that the electrical stability was higher than in the drilling fluid used in Example 1 which is an indication that there was more emulsifier present in the drilling fluid used in this example. A higher concentration of acid was therefore required for neutralization of the increased amount of emulsifier.

One skilled in the art can see that mixing time had a negligible affect on the density of the recovered oil.

Example 4

Testing was conducted to confirm that the recovered oil could be re-used to make another drilling fluid. The recovered oil was recovered as per Example 1 and was used for the preparation of two drilling fluid formulations (Formulation 1 and 2). The recovered oil had a density of 0.853 kg/m$^3$. The formulations used were:

TABLE 4

| Additive Name | Formulation 1 | Formulation 2 |
|---|---|---|
| Recycled Base Oil | 221.7 g | 198.5 g |
| EM 1000 | 3.5 ml | 4 ml |
| EM 1200 | 0.35 ml | 0.7 ml |
| Baragel 3000 (Organoclay) | 4 g | 3 g |
| Lime | 5 g | 5 g |
| Calcium Chloride (94%) | 10.5 g | 9.4 g |
| Water | 29.3 ml | 26.4 ml |
| Barite | 176.6 g | 310.5 g |
| OWR | 90/10 | 90/10 |
| Density | 1300 kg/m$^3$ | 1600 kg/m$^3$ |

EM 1000 is a primary/secondary emulsifier package supplied by ICTC
EM 1200 is a wetting agent supplied by ICTC.

The following procedure was utilized to prepare the drilling fluid formulations. Mixing was performed using a Hamilton Beach Mixer on low setting:
  Add emulsifiers to base oil and mix for 2 minutes.
  Slowly add lime and mix for 8 minutes.
  Slowly add Baragel 3000 and mix for 10 minutes
  Slowly add brine (Calcium Chloride and Water) and mix for 20 minutes
  Slowly add Barite and mix for the remaining time to a total mixing time of 60 minutes.

Once the formulations were prepared, each formulation was hot rolled at 250° F. for 16 hours in ageing cells pressurized to 100 psi with nitrogen to simulate use in a wellbore. Subsequent rheology and ES testing was performed at 50° C.

TABLE 5

| | Before hot rolling | | | | | | | | |
|---|---|---|---|---|---|---|---|---|---|
| Formulation | 600 rpm | 300 rpm | 200 rpm | 100 rpm | 6 rpm | 3 rpm | PV | YP | ES |
| 1 | 45 | 26 | 19 | 11 | 2 | 1.5 | 19 | 3.5 | 1000 |
| 2 | 56 | 31 | 23 | 15 | 4 | 3.5 | 25 | 3 | 960 |

TABLE 6

| | After hot rolling | | | | | | | | |
|---|---|---|---|---|---|---|---|---|---|
| Formulation | 600 rpm | 300 rpm | 200 rpm | 100 rpm | 6 rpm | 3 rpm | PV | YP | ES |
| 1 | 49 | 28 | 20 | 14 | 5 | 5 | 21 | 3.5 | 670 |
| 2 | 57 | 34 | 26 | 18 | 7 | 7 | 23 | 5.5 | 720 |

While acceptable parameters vary from operator to operator, it is generally thought that an ES of >500 is an acceptable result following hot rolling. Values are obtained at different rpm's (600-3) as representative of subjecting the mud to different shear rates.

Following hot rolling of the drilling fluid formulations, the formulations were recycled again using embodiments of the invention as described in Example 1. The density of the recovered oil was 0.880 kg/m$^3$.

It should be noted that the experimentation done in Example 4 was performed before Applicant had confirmed that additional emulsifiers were not required and therefore emulsifiers EM1000 and EM1200 were added but were not required.

One skilled in the art can see that drilling fluids can be made using base oil recovered according to embodiments of the invention.

Example 5

Testing was conducted to confirm that the recovered oil could be re-used to make another drilling fluid without the use of any additional emulsifier. The oil was recovered as per Example 1 and was used to create the following formulation (Formulation 3). Testing procedures were used as in Example 4.

TABLE 7

| Additive Name | Formulation 3 |
| --- | --- |
| Recycled Base Oil | 252.3 g |
| Baragel 3000 (Organoclay) | 6 g |
| Lime | 5 g |
| Calcium Chloride (94%) | 11.9 g |
| Water | 33.2 ml |
| OWR | 90/10 |
| Density | Unweighted |

Tables 8 and 9 show the results of the fluid testing before and after hot rolling.

TABLE 8

| | Before hot rolling | | | | | | | | |
| --- | --- | --- | --- | --- | --- | --- | --- | --- | --- |
| Formulation | 600 rpm | 300 rpm | 200 rpm | 100 rpm | 6 rpm | 3 rpm | PV | YP | ES |
| 3 | 34 | 20 | 16 | 10 | 2.5 | 2 | 14 | 3 | 1260 |

TABLE 9

| | After hot rolling | | | | | | | | |
| --- | --- | --- | --- | --- | --- | --- | --- | --- | --- |
| Formulation | 600 rpm | 300 rpm | 200 rpm | 100 rpm | 6 rpm | 3 rpm | PV | YP | ES |
| 3 | 36 | 24 | 19 | 12 | 5 | 5 | 12 | 6 | 740 |

One skilled in the art can see that drilling fluids can be made using base oil recovered according to embodiments of the invention without the addition of emulsifiers.

Example 6

Testing was conducted to confirm that the addition of corrosion inhibitors had no detrimental effect on recovered base oil and that the base oil could be re-used to make another drilling fluid without the use of any additional emulsifier. A corrosion inhibitor was added to the acid and non-emulsifier for treating the spent mud following treatment with DDBSA. The oil was otherwise recovered as per Example 1 and was used to create the following formulation (Formulation 4). The oil recovered had a density of 0.866 g/cm$^3$. Testing procedures were used as in Example 4.

TABLE 10

| Additive Name | Formulation 4 |
| --- | --- |
| Recycled Base Oil | 252.3 g |
| Baragel 3000 (Organoclay) | 6 g |
| Lime | 10 g |
| Calcium Chloride (94%) | 11.9 g |
| Water | 33.2 ml |
| OWR | 90/10 |
| Density | Unweighted |

Tables 11 and 12 show the results of the fluid testing, before and after hot rolling.

TABLE 11

| | Before hot rolling | | | | | | | | |
| --- | --- | --- | --- | --- | --- | --- | --- | --- | --- |
| Formulation | 600 rpm | 300 rpm | 200 rpm | 100 rpm | 6 rpm | 3 rpm | PV | YP | ES |
| 4 | 58 | 38 | 31 | 20 | 8 | 7 | 20 | 9 | 1500 |

TABLE 12

| | After hot rolling results | | | | | | | | |
| --- | --- | --- | --- | --- | --- | --- | --- | --- | --- |
| Formulation | 600 rpm | 300 rpm | 200 rpm | 100 rpm | 6 rpm | 3 rpm | PV | YP | ES |
| 4 | 54 | 37 | 29 | 20 | 12 | 12 | 17 | 10 | 940 |

One skilled in the art can see that the addition of corrosion inhibitor has no detrimental effect on the recovered base oil according to embodiments of the invention and that a drilling fluid can be made without any additional emulsifiers.

The embodiments of the invention in which an exclusive property or privilege is claimed are defined as follows:

1. A method for recycling a used, water-in-oil emulsion drilling mud comprising fatty acid emulsifiers or derivatives thereof, the method comprising:
    adding an acid to the used mud sufficient to reduce the pH of a water phase to a value less than 7 for deactivating the fatty acid emulsifiers or derivatives thereof in the drilling mud, the acid selected for having low affinity for an oil phase of the drilling mud;
    mixing the drilling mud with the acid for sufficient time to deactivate the fatty acid emulsifiers or derivatives thereof;
    separating the treated drilling mud for separating the base oil phase from the water phase and from solids, including ultra-fine solids and organoclays, contained therein, the recovered base oil phase containing at least substantially all of the deactivated fatty acid emulsifiers or derivatives thereof; and
    adding lime to the recovered base oil phase for reactivating the fatty acid emulsifiers or derivatives thereof contained therein for use in preparing a new drilling mud without the need to add additional fatty acid emulsifiers or derivatives thereof.

2. The method of claim 1 further comprising prior to adding the acid:
adding a surfactant, the amount of surfactant being sufficient to prevent viscosity increases as a result of water-wetting of the organoclays in the used drilling mud; and
mixing the surfactant with the used drilling mud.

3. The method of claim 2 wherein the surfactant is an anionic surfactant.

4. The method of claim 2 wherein the surfactant is dodecyl benzene sulphonic acid (DDBSA).

5. The method of claim 4 wherein the DDBSA is added in an amount from 0% to about 10% by volume.

6. The method of claim 4 wherein the DDBSA is added in an amount from 0% to about 3% by volume.

7. The method of claim 1 wherein the separating is by centrifugation.

8. The method of claim 1 wherein the acid further comprises a non-emulsifier, the amount of the non-emulsifier being sufficient to prevent the acid from forming an oil-in-water or an oil-in-water-in-oil emulsion in the drilling mud.

9. The method of claim 8 wherein the non-emulsifier is added in amount from 0% to about 10% by weight.

10. The method of claim 8 wherein the non-emulsifier is added in amount from 0% to about 3% by weight.

11. The method of claim 8 wherein the non-emulsifier is selected to be soluble in the acid and to remain substantially in the water phase.

12. The method of claim 1 wherein the acid is a mineral acid.

13. The method of claim 12 wherein the acid is hydrochloric acid added in a range of from about 1 volume % to about 99 volume %.

14. The method of claim 12 wherein the acid is hydrochloric acid added in a range of from about 5 volume % to about 60 volume %.

15. The method of claim 1 wherein the acid further comprises a corrosion inhibitor.

16. The method of claim 1 wherein the lime is added in an amount sufficient to achieve desired emulsion stability.

17. The method of claim 8 wherein the non-emulsifier is a mixture of polyalkylene glycols.

18. The method of claim 15 wherein the corrosion inhibitor is soluble in the acid.

\* \* \* \* \*